United States Patent [19]

Prochazka

[11] 4,004,934

[45] * Jan. 25, 1977

[54] SINTERED DENSE SILICON CARBIDE

[75] Inventor: Svante Prochazka, Ballston Lake, N.Y.

[73] Assignee: General Electric Company, Schenectady, N.Y.

[ * ] Notice: The portion of the term of this patent subsequent to Dec. 10, 1991, has been disclaimed.

[22] Filed: Apr. 22, 1976

[21] Appl. No.: 679,207

Related U.S. Application Data

[63] Continuation-in-part of Ser. No. 409,073, Oct. 24, 1973, abandoned.

[52] U.S. Cl. .................................. 106/44; 264/65
[51] Int. Cl.$^2$ ...................................... C04B 35/56
[58] Field of Search ................ 106/44; 264/65

[56] References Cited

UNITED STATES PATENTS

| | | | |
|---|---|---|---|
| 2,636,825 | 4/1953 | Nicholson | 106/44 |
| 2,637,091 | 5/1953 | Nicholson | 106/44 |
| 2,908,553 | 10/1959 | Frank et al. | 106/44 x |
| 2,916,460 | 12/1959 | Van der Beck, Jr. | 106/44 |
| 3,065,088 | 11/1962 | Janes et al. | 106/44 |
| 3,079,273 | 2/1963 | Johnson | 106/44 X |
| 3,175,918 | 3/1965 | McGahan | 106/44 X |
| 3,459,566 | 8/1969 | Wilson, Jr. et al. | 106/44 |
| 3,649,342 | 3/1972 | Bartlett | 106/44 X |
| 3,765,300 | 10/1973 | Taylor et al. | 106/44 X |
| 3,808,012 | 4/1974 | Bailey et al. | 106/44 |
| 3,852,099 | 12/1974 | Prochazka | 106/44 |
| 3,853,566 | 12/1974 | Prochazka | 106/44 |

*Primary Examiner*—Winston A. Douglas
*Assistant Examiner*—Mark Bell
*Attorney, Agent, or Firm*—Jane M. Binkowski; Joseph T. Cohen; Jerome C. Squillaro

[57] ABSTRACT

A method of making a dense silicon carbide ceramic is disclosed involving the steps of homogeneously dispersing silicon carbide with a sufficient amount of a boron containing additive and a carbonaceous additive, forming the powder mixture into a shaped green body and then sintering the body in a controlled atmosphere and in the absence of external pressure at a temperature of about 1900°–2100° C. such that density of the body is at least 85% of the theoretical density of silicon carbide. The complex shaped silicon carbide product formed thereby is also disclosed.

23 Claims, 1 Drawing Figure

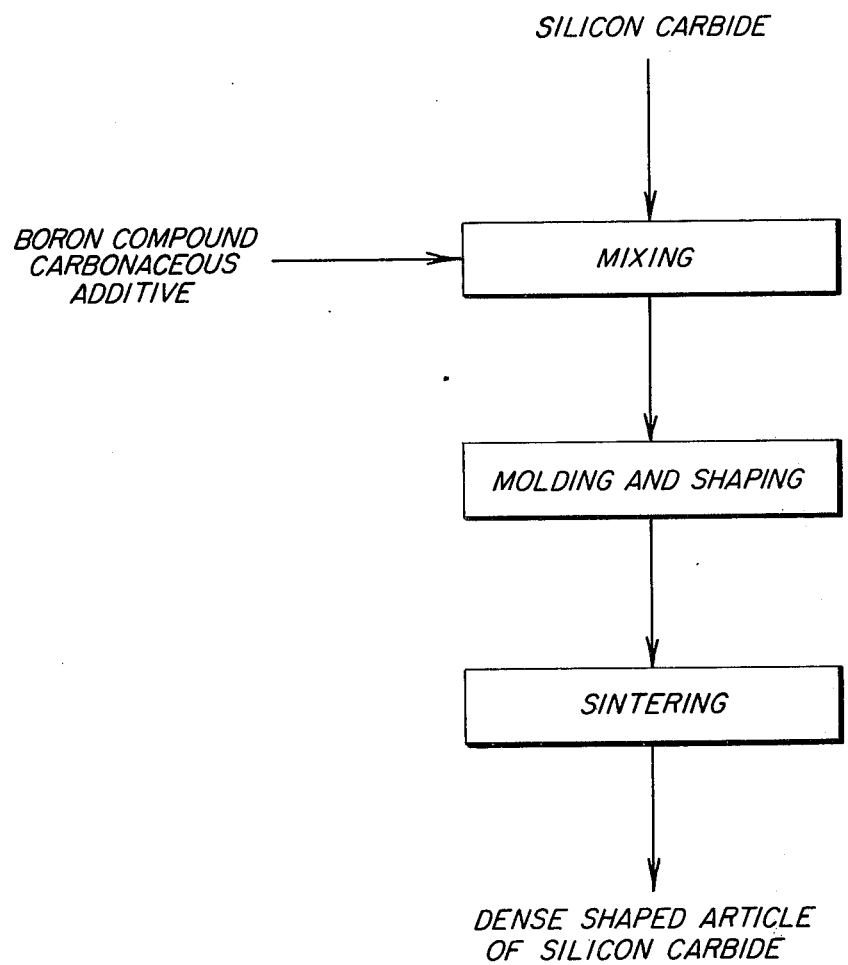

SINTERED DENSE SILICON CARBIDE

The invention herein described was made in the course of or under a contract or subcontract thereunder (or grant) with the Department of the Navy.

This is a Continuation-in-part of copending application Ser. No. 409,073 filed Oct. 24, 1973, now abandoned.

The chemical and physical properties of silicon carbide make it an excellent material for high temperature structural applications. These properties include good oxidation resistance and corrosion behavior, good heat transfer coefficients, low thermal expansion coefficient, high thermal shock resistance and high strength at elevated temperature. This unique combination of properties suggests the use of silicon carbide as components for gas turbines, check valves for handling corrosive liquids, linings of ball mills, heat exchangers and refractories for high temperature furnaces, pumps for die casting machines and combustion tubes.

Heretofore, hot pressing of silicon carbide was used to produce small specimens under closely controlled conditions. Unfortunately, silicon carbide is not easily sintered to densities approaching the theoretical density of 3.21 grams per cubic centimeter. A method of hot pressing silicon carbide to uniform densities on the order of 98% of the theoretical density with slight additions of aluminum and iron aiding in densification is disclosed by Alliegro et al., J. Ceram. Soc., Vol. 39, II (November 1956), pages 386-389.

My copending application entitled HOT PRESSED SILICON CARBIDE, Ser. No. 317,426, filed Dec. 21, 1972, describes an improved method of making a dense silicon carbide ceramic by forming a homogeneous dispersion of a submicron powder of silicon carbide and a boron containing additive and hot pressing the dispersion at a temperature of about 1900°–2000° C. and at a pressure of about 5,000–10,000 psi for a sufficient time to produce a dense nonporous silicon carbide ceramic. The advantage of boron as a sintering aid, in comparison to other materials such as alumina, aluminum nitride and other metallic compounds, is that boron provides increased oxidation and corrosion resistance at elevated temperature. Subsequently, Prochazka et al, in the copending application Ser. No. 378,918 filed July 13, 1973, disclosed a further improvement in hot pressing silicon carbide by incorporating a carbonaceous additive into the homogeneous dispersion of silicon carbide and boron containing additive powders. The addition of the carbon suppresses exaggerated grain growth in the microstructure of the dense silicon carbide ceramic product and yields improved strength properties. However, hot pressing yields excellent materials only in the form of billets having a simple geometric shape and such billets require expensive machining whenever a complex shaped part is required.

In accordance with the present invention I have discovered a method of making a dense silicon carbide ceramic by forming a homogeneous dispersion of a submicron powder consisting essentially of silicon carbide, a boron-containing additive and a carbonaceous additive. The dispersion is then formed into a shaped green body and sintered in a controlled atomsphere inert to silicon carbide at a temperature of about 1900°–2100° C. to form a shaped silicon carbide body having a density of at least 85% of the theoretical density. The preferred product obtained has a density of at least 98% of the theoretical density. It is suitable as an engineering material such as, for example, in high temperature gas turbine applications.

The accompanying drawing, which is a flow sheet of the novel process, while not intended as a definition essentially illustrates the invention. A full discussion is set forth hereinbelow.

It is essential that the powder dispersion is a mixture of submicron particle sized powders in order to obtain the high densities and strengths upon sintering. These may be obtained by different techniques as, for example, by direct synthesis from the elements, by reduction of silica, or by pyrolysis of compounds containing silicon and carbon. The pyrolytic technique is particularly advantageous in that it yields a powder having a controlled particle size, a predetermined composition and is composed mainly of isolated crystallites. In this process trichloromethylsilane vapor and hydrogen or a mixture of $SiCl_4$ vapor and a suitable hydrocarbon vapor, such as toluene, and hydrogen are introduced into an argon plasma generated between two concentric electrodes. In the hot plasma the compounds decompose into ions and the most stable molecules, i.e., SiC and HCl, form on cooling the gases. The SiC is prepared as small crystals typically 0.1–0.3$\mu$ in size. The advantage of this product is that the crystallites are not aggregated and that the carbon to silicon ratio can be controlled by monitoring the initial vapor composition so that SiC powders slightly enriched in carbon can be obtained. Moreover, $BCl_3$ can be further added to the reactants in the desired amounts whereby the SiC powders are doped with boron which has been dispersed essentially on a molecular level.

Another process for preparing silicon carbide powder with excellent sintering properties is disclosed by Prener in U.S. Pat. 3,085,863 entitled METHOD OF MAKING SILICON CARBIDE. The patent teaches a process of making pure silicon carbide which includes the steps of forming a silica gel in sugar solution, dehydrating the gel to decompose the sugar and to form finely divided mixture of silica and carbon, and heating the mixture in an inert atomsphere to form silicon carbide. We have found that it is preferable to modify this procedure by substituting ethylsilicate for the silicon tetrachloride to eliminate the inconvenience of vast amounts of hydrochloric acid released on hydrolysis.

The boron containing additive may be in the form of a submicron sized powder and further may be either as elemental boron or boron carbide. Alternatively, the boron may be added directly to the silica gel in the form of a boron compound, such as boric acid during the preparation of the silicon carbide powder. In order to obtain densification, the amount of boron containing additive is critical, the amount of the additive being equivalent to about 0.3–3.0% by weight of elemental boron. Experiments on sintering of silicon carbide with the boron containing addition indicate that there is a lower limit of efficiency below which there is essentially no effect. This critical concentration appears to be equivalent to between 0.3–0.4% by weight of boron. A further increase in boron concentration does not bring out enhancement of densification, and, when the amount is equivalent to more than 3.0% by weight of boron, the oxidation resistance of the product is degraded.

The optimum amount to be added by powder mixing procedures is about equivalent to one part by weight boron per 100 parts of silicon carbide. This optimum amount is probably related to the solubility limit of boron in silicon carbide which has to be approached or exceeded in order to get segregation of boron at grain boundaries and the resulting effect. However, as there are limitations to the degree of dispersion of boron in the silicon carbide powder which can be achieved, it is advantageous to slightly exceed the lower limit of effectiveness of boron. This brings about safe densification throughout the compact and eliminates islets of lower densification which may form with low concentrations and incomplete mixing. Thus, for the most part, an amount equivalent to 1% by weight of boron is the minimal addition when elemental boron powder is mechanically mixed with silicon carbide powders. On the other hand, when boron is introduced during preparation of silicon carbide powders, the most desirable dispersion is achieved and an addition of only an amount equivalent to about 0.4% by weight of boron gives satisfactory results.

In order to obtain high degrees of densification, the oxygen content of the powder has to be very low, i.e., less than 0.1 weight percent and a small excess of carbon is necessary. Thus, for instance, a powder which contained 0.4% by weight boron and no free carbon exhibits on firing at 2020° C. a linear shrinkage of only 5% which corresponded to about 70% final theoretical density. When, however, an addition of carbon is made in the form of a soluble carbonaceous compound prior to compacting, the linear shrinkage increases to 18% and the density is 96% of the theoretical after firing under the same conditions. Thus, clearly, some free carbon is absolutely essential to the sintering of SiC.

The function of carbon is to reduce silica which always is present in silicon carbide powders in small amounts or which forms on heating from oxygen adsorbed on the powder surfaces. Carbon then reacts during heating with the silica according to the reaction: $SiO_2 + 3C = SiC + 2CO$. Silica, when present in the SiC powders in appreciable amounts, halts densification of silicon carbide completely so that little or no shrinkage is obtained.

There is an additional role of the free carbon. It will act as a getter for free silicon if present in the powders or if it is formed by the following reaction during heating up to the sintering temperature: $SiO_2 + 2SiC = 3Si + 2CO$. The presence of silicon, just as the silica, tends to halt or retard densification of SiC and must be eliminated. The amount of carbon required depends largely upon the oxygen content in the starting SiC powders. Thus, for instance, a boron doped powder with an oxygen content of 0.06% sinters easily to 98.5% of the theoretical density with an addition of 0.3% carbon. Another powder containing 0.3% oxygen sinters to 91% relative density with 0.9% free carbon. A substantial excess of carbon beyond the necessary amount for deoxidation of the SiC is harmful. Carbon generally is difficult to disperse and the unreacted excess carbon tends to form voluminous grains in the sintered SiC matrix that act much like permanent pores and such excess thereby limits the ultimate achievable density and strength. Systematic experiments have shown that 0.1 to 1.0 weight percent carbon is sufficient to provide sinterability. The extent of the reaction of elemental carbon in the present process depends on the amount of $SiO_2$ or oxygen as well as free silicon with which it reacts, and such reactions can consume all of the carbon leaving no detectable carbon in the final sintered product, but frequently, the sintered product contains about 0.1% to 1% by weight elemental carbon based on the silicon carbide. Powder which does not sinter under these conditions will not sinter even when more carbon was added.

Since carbon in the form of a powder is difficult to disperse uniformly on a submicron level, it is advantageous to introduce it as a solution of a carbonaceous organic compound which is subsequently pyrolyzed into carbon. Certain general functional criteria may thus be established which may be used to describe the characteristics of the carbonaceous additive. Firstly, compounds which readily crystallize from solutions, such as sugar from an aqueous solution, will tend to precipitate as crystals during evaporation of the solvent. Such crystals turn into relatively large carbon particles on pyrolysis and form undesirable inclusions in the microstructure of the final product. Hence, compounds which do not crystallize from solution are preferred. Secondly, compounds derived from aliphatic hydrocarbons give low yields of carbon which moreover varies with the rate of heating, so that no exact control may be exercised over the carbon addition. The low yield is therefore another serious limitation. For instance, acrylic resins which yield about 10% carbon on pyrolysis are not effective.

High molecular weight aromatic comounds are the preferred material for making the carbon addition since these give high yield of carbon on pyrolysis and do not crystallize. Thus, for instance, a phenol-formaldehyde condensate-novolak which is soluble in acetone or higher alcohols, such as butyl alcohol, may be used as well as many of the related condensation products, such as resorcinolformaldehyde, aniline-formaldehyde, cresolformaldehyde, etc. Similar compounds yield about 40–60% of carbon. Another satisfactory group of compounds are derivatives of polynuclear aromatic hydrocarbons contained in coal tar, such as dibenzanthracene, chrysene, etc. A preferred group of carbonaceous additives are polymers of aromatic hydrocarbons such as polyphenylene or polymethylphenylene which are soluble in aromatic hydrocarbons and yield up to 90% of carbon. However, the addition of elemental carbon directly to the silicon carbide powder is less practical, since it is very difficult to obtain the required degree of distribution and, frequently, large amounts of carbon inclusions are found after sintering. Such inhomogeneities have, of course, a detrimental effect on strength because they initiate fractures.

An excellent way to introduce carbon into the submicron silicon carbide powders is by adding a solution of the carbonaceous substance which is decomposed to carbon on being heat treated. In making the carbon addition, the first step is to prepare a solution of the selected carbonaceous compound in a convenient solvent preferably having a moderately high melting point in case freeze drying is to be used. The powder is then dispersed in the desired amount of solution containing the necessary amount of the organic compound. The volume of the solvent required is an amount sufficient to yield a thin slurry when the silicon carbide powder is fully dispersed. The solvent is then evaporated either directly from the liquid dispersion or by freeze drying the dispersion and subliming off the solvent in vacuum. This latter procedure has the advantage, that it prevents inhomogeneities in the distribution of the additive which are always introduced on drying in the liquid state due to the migration of the solute. In this way, a uniform coating of the organic substance on the silicon carbide crystallites is obtained which yields the desired degree of carbon distribution.

Another approach to improved carbon distribution on a submicron particle size level is the application of jet milling. The silicon carbide powder is soaked with a solution of, for instance, a novolak resin in acetone, dried in air and heated up to 500° C. to 1800° C. in nitrogen to pyrolyze the resin. The actual amount of carbon introduced by this process is determined as weight gain after the pyrolysis or by analysis of free carbon. The powder with the added carbon is then jet milled which greatly improves the distribution of carbon and eliminates major carbon grains in the sintered product.

To mold and shape the powder into a desired form, any of the conventional techniques generally used in the field of ceramics may be applied and the processing of the powder mixture is treated accordingly.

In die pressing, the powder usually requires the addition of a small amount of lubricants, such as 1 weight percent of stearates, although some powders can be pressed into simple shapes without such additions. Thus, for example, 300 g. of the SiC powder to which an addition of boron and carbon is made on preparation, is dispersed in 300 cc. of a 1% solution of aluminum stearate in benzene and milled in a plastic jar by cemented carbide balls for 5 hours. After that the slip is strained through a 200 mesh sieve, and the solvent is evaporated. The resulting powder may then be pressed at 5000 psi to shapes having a green density of about 55%. The same powder may also be isostatically pressed into more complex shapes such as tubes, crucibles, etc., by the wet-bag method. The application of 30,000 psi pressure yields a green density corresponding to 59%.

To obtain more complex shapes, the green body may be machined by grinding, milling, etc. or if desired it may first be prefired at a temperature of about 1600° C. in an atmosphere of nitrogen or argon to obtain greater initial strength. In any case, shrinkage should be taken into account in determining the final dimensions. These dimensions, after firing, are of course, the function of the green and fired densities and are established in a conventional manner.

It is also feasible to slip cast the silicon carbide powders. A convenient dispersion medium is water and the deflocculant is specific of powders prepared by different procedures previously discussed. Casting slips with up to 40 volume percent of solid can be prepared by dispersing the powder in water to which the deflocculant is added and ball milling the suspension for several hours. The shaping is done by casting in plaster-of-paris molds according to conventional slip casting techniques.

Furthermore, the silicon carbide powder mixture can be extruded or injection molded by the addition of a binder to form a moldable paste. There exists a wide selection of useful binders which will decompose and evaporate on heating in an inert atmosphere without an appreciable residue, as exemplified by polyethylene glycol, or which may be removed by a porous contacting media in much the same fashion as the vehicle is removed in slip casting.

Firing of the silicon carbide compacts can be done in conventional high temperature furnaces provided with means to control the furnace atmosphere. It is advantageous particularly with large shapes, to separate the firing operation into two steps carried out in separate furnaces. This is so because the high temperature furnaces usually lack good temperature control at low temperatures where the molding additives are eliminated. The prefiring is done in an inert atmosphere such as argon, helium, nitrogen and hydrogen which contains less than about 10 ppm oxygen. A temperature of 1500° C. is usually sufficient to attain good strength for further handling, but somewhat higher or lower temperatures may be used depending upon the degree of strength required for green machining.

The densification of the compact is by pressureless sintering without the aid of external pressure. This is distinguished from hot pressing during which a substantial external pressure must be applied. The final sintering must be performed in an atmosphere inert to SiC such as those listed above or mixtures thereof and also in vacuum. Nitrogen has a specific effect in that it suppresses or retards the $\beta$ to $\alpha$-(6H) SiC transformation. This transformation which proceeds in SiC above about 1600° brings about exaggerated grain growth of the $\alpha$-(6H) phase. Due to this process the SiC powder coarsens frequently before the ultimate density is achieved and this coarsening holds further densification at some lower final density typically 85 to 90%. Nitrogen, however, prevents this coarsening by stabilization of the $\beta$-SiC phase so that high densities are achievable. Nitrogen also slows down the rate of sintering so that with higher nitrogen pressure, a higher temperature have to be applied. Thus for instance a silicon carbide powder compact may be fired in 40 mm. Hg nitrogen at 2020° C to 96.5% theoretical density. In 760 mm Hg nitrogen, a temperature 2100° C is necessary to obtain 95%. However, the higher the nitrogen pressure, the greater the grain growth control and the optimum firing conditions may be established by routine experimentation.

The temperature schedule employed during sintering depends on the volume of the parts to be fired. Small specimens weighing several grams are generally quite insensitive to the temperature program and can be conveniently brought up to the firing temperature in about 15 minutes. A hold 15 minutes at the peak temperature will bring about the desired density. An extended dwell at high temperature is harmful because it brings about coarsening of the microstructure and consequently degradation of mechanical properties. Thus, the shortest necessary hold is preferable.

With large shapes, the firing schedule has to be extended to allow for nitrogen diffusion through the body on heating up and to avoid thermal gradients in the fired bodies. Thus, for instance, a 250 g. pressing may be pre-fired at 1500° C. and transferred into the high temperature furnace. In an argon-nitrogen protective atmosphere, the pressing can be heated up to 1600° C. in 40 min. and the temperature then gradually increased up to 2020° C. in 80 min. and held there for an additional 60 minutes. Cooling is not critical, because of the high thermal conductivity of sintered silicon carbide.

The nitrogen atmosphere, on firing, has an additional specific effect on the sintered SiC in that it induces electrical conductivity by introducing n-type semiconductivity. The degree of conductivity is proportional to the nitrogen pressure on sintering but is also affected by minor amounts of other elements and impurities which enter the lattice. Thus, by monitoring the nitrogen pressure in the furnace, it is possible to prepare polycrystalline SiC with a resistivity range from $10^4$ ohm-cm typical for nitrogen free sintering atmospheres to $10^{-1}$ ohm-cm typical for an atmosphere of 760 torr $N_2$.

My novel process now makes it possible to fabricate complex shaped articles of a high grade single phase, polycrystalline silicon carbide by conventional ceramic techniques. Heretofore, such complex shaped articles could either not be manufactured from silicon carbide at all or required expensive and tedious machining because of the very nature of the material. Thus, articles, such as gas turbine airfoils, impervious crucibles, thin walled tubes, long rods, spherical bodies, and hollow shapes, e.g. gas turbine blade, can now be obtained directly. The preferred high density silicon carbide, of which the articles are formed, has a density of at least 95% of theoretical a modulus of rupture of about 80,000 psi, a high resistance to oxidation, a high resistance to creep at 1,500° C. and essentially the desirable properties of hot pressed silicon carbide as reported in the copending application Ser. No. 378,918. Moreover, the sintered silicon carbide may be prepared in such a way that the product has a wide range of electrical resistance properties.

My invention is further illustrated by the following examples:

EXAMPLE I

A submicron silicon carbide powder was prepared and characterized and the results are listed below:

| | |
|---|---|
| Oxygen ppm | 600 |
| Nitrogen ppm | < 50 |
| Free carbon ppm | 6000 |
| Iron ppm | 180 |
| Aluminum ppm | < 10 |
| Boron ppm | 4000 |
| Specific surface area, m²/g | 16 |
| Mean surface average crystallite size, μm | 0.15 |
| X-ray diffraction: | β-SiC traces of α-SiC 6H |

Two hundred grams of the silicon carbide powder were dispersed in 200 cc. of a solution of 1 g. aluminum stearate and 1 g. oleic acid in benzene and ball milled for 2 hrs. with cemented carbide balls. The slurry was strained through a 150 mesh U.S. Standard sieve and freeze dried. The obtained friable cake was broken up and sifted through a 42 mesh U.S. Standard sieve. Pressing of the resulting powder in a 2.5 in. diameter steel die at 5000 psi yielded a density 1.65 g./cc. which is equivalent to 51.5% of the theoretical. On isostatic repressing of the blank at 25,000 psi the density increased to 1.76 g./cc. which is equivalent to 55% of the theoretical.

The pressing was fired in a graphite resistor furnace in flowing nitrogen at 40 mm. Hg pressure with the following temperature schedule:

| | |
|---|---|
| R.T. to 200° C. | 10 min. |
| 200° C. to 400° C. | 50 min. |
| 400° C. to 1500° C. | 30 min. |
| 1500° hold | 30 min. |
| 1500°–1950° C. | 20 min. |
| 1950°–2020° C. | 30 min. |
| 2020° C. hold | 40 min. |

After the 40 min. hold at the highest temperature the furnace was shut off, filled with nitrogen to atmospheric pressure and allowed to cool to room temperature.

The disc underwent 19.5% shrinkage (based on the green diameter) and had a density of 3.16 g./cc. which is equivalent to 98% of the theoretical. Sectioning and microscopy revealed that it had bimodal microstructure composed of a matrix about 3 μm grain size and large tabular crystals up to 200 μm.

A disc pressed in a steel die only, having green density 51.5% of the theoretical, fired at the same conditions yielded a fired density 3.07 g./cc. corresponding to 96.2% of the theoretical. The electrical resistivity was 70Ωcm.

EXAMPLE II

A pressing prepared from a powder described in Example I (green density of 51%) was fired in flowing nitrogen at atmospheric pressure at a similar temperature-time schedule with the peak temperature increased to 2080° C. The final density of the body was 96% of the theoretical. Sectioning revealed a refined microstructure with grains not exceeding 20 μm. Electrical resistance was 0.2Ωcm.

EXAMPLE III

A cylinder having a diameter of ⅝ inch and ½ inch long pressed at 5000 psi from the powder composition described in Example I (green density 51%) was fired in flowing argon at 40 mm. Hg at 2080° C. for 15 min. and cooled to room temperature. The final relative density was 91.5% and the microstructure was coarse grained, composed of large tabular crystals. The electrical resistivity was $8 \times 10^3$ Ωcm.

EXAMPLE IV

A specimen of the same size and green density as described in Example III was fired in a vacuum of 100 microns Hg (the residual atmosphere being composed of $N_2$ and CO) at 2000° C. for 15 min. The final density was 93% of the theoretical and the resistivity $4 \times 10^3$ Ωcm. The specimen's surface was covered by carbon due to decomposition of SiC and volatilization of silicon.

EXAMPLE V

An aqueous slip was prepared from the submicron SiC characterized in Example I by mixing 400 g. of the powder with 250 cc. of distilled water and adding 2 cc. of sodium silicate solution containing 20% $Na_2O.3SiO_2$ (22 Be). The slip was ball milled for 2 hours with cemented carbide balls and strained through a 150 mesh sieve.

Crucibles 1½ inches diameter × 1-½ inches high were then formed from the slip by drain casting into plaster-of-paris molds removed from the die and dried. The castings were fired in flowing nitrogen at 40 mm. Hg in a firing cycle described in Example I. The final density was 95.5% of the theoretical and the shrinkage was 18.5%.

EXAMPLE VI

A commercial silicon carbide powder of similar characteristics as the one described in Example I but containing less than 20 ppm. of boron was processed, pressed into a ⅝ inch diameter pellet (green density 60%) and fired at 2020° C. in flowing $N_2$ at 40 mm. Hg for 15 minutes. No shrinkage or densification was observed.

EXAMPLE VII

To the same powder as in Example VI was added 1% amorphous boron which was jet milled to a particle size < 2 μm 50 g. of the powder mixture was dispersed in benzene and milled with cemented carbide balls for 2 hours. The slip was dried and the resulting powder pressed into ⅝ inch diameter pellets having 60% green density. Firing of the specimens in flowing nitrogen at 600 torr at 2080° C. for 20 minutes resulted in 12 % shrinkage. The final density was 93% of the theoretical.

EXAMPLE VIII

Amorphous silica and carbon black were mixed in a molar ratio ¼ and fired in hydrogen at 1600° C. for 2 hours. The product was refired at 700° C. in air for 5 hours until the unreacted carbon was burned off. The resulting powder was leached with 20% hydrofluoric acid, washed with water and ethyl alcohol and dried. The product was characterized as pure β-SiC by X-rays and contained less than 2000 ppm. metallic impurities, 0.2% oxygen and 0.08% nitrogen.

The powder was combined with 1% by weight boron using the same procedure described in Example VII and jet milled. Pressing at 5000 psi yielded pellets of 50% relative density. Firing in flowing nitrogen at 40 mm. Hg and 2020° C. resulted in 3% shrinkage and a final density of 61%.

EXAMPLE IX

The processed powder described in Example VIII was dispersed in a solution of 1 g. of polymethylphenylene in 100 cc. toluene. The dispersion of 10 g. of the powder in 10 cc. of the solution was dried and resulted into an approximately 0.9% of carbon addition on pyrolysis of the organic compound.

This powder was pressed into ⅝ inch diameter pellets (green density 49%) and fired in flowing nitrogen at 40 mm. Hg and 2020° C. The specimens underwent 14.5% shrinkage and had a final density of 85%.

EXAMPLE X

SiC powder specified in Example VI was combined with 1% aluminum metal powder and mixed dry. 20 g. of the mixture was jet-milled using nitrogen as grinding medium. 10 g. of the obtained powder was dispersed in 10 g. of the obtained powder was dispersed in 10 cc. of a 1% solution of aluminum stearate and dried. Compaction in ⅝ inch diameter steel die yielded 55% green density. The specimen was fired in vacuum (at 100 μm Hg) at 2020° C. for 15 minutes. The fired cylinders showed 4% shrinkage and a final density about 65%.

EXAMPLE XI

SiC powder specified in Example VIII was compacted without any addition at 5000 psi in a steel die to a density of 51%. The pellet was fired in low pressure nitrogen (at 40 mm. Hg) at 2080° C. for 15 minutes. No shrinkage was detected in the fired specimen.

It will be appreciated that the invention is not limited to the specific details shown in the examples and illustrations and that various modifications may be made within the ordinary skill in the art without departing from the spirit and scope of the invention.

What is claimed is:

1. A method of making a pre-shaped dense sintered silicon carbide ceramic article comprising the steps of:
  a. forming a homogeneous dispersion of a submicron powder of
    1. β-silicon carbide,
    2. a boron containing compound in an amount equivalent to about 0.3-3.0% by weight of boron based on said silicon carbide, and
    3. an elemental carbon source selected from the group consisting of elemental carbon and a carbonaceous additive in an amount equivalent to 0.1-1.0% by weight of elemental carbon based on said silicon carbide;
  b. shaping the homogeneous dispersion into a green body substantially of the form of said desired final pre-shaped sintered article and of dimensions larger than those of said desired sintered article by the amount of sintering shrinkage, and
  c. sintering the green body in an inert atmosphere chemically-inert with respect to silicon carbide at atmospheric pressure or below atmospheric pressure at a temperature of about 1900°-2100° C until the ceramic article has a density of at least 85% of theoretical, said carbonaceous additive being pyrolyzable to produce said elemental carbon at a temperature below sintering temperature.

2. The method of claim 1 wherein said boron compound is elemental boron.

3. The method of claim 1 wherein said boron compound is boron carbide.

4. The method of claim 1 wherein said green body is formed by slip casting.

5. The method of claim 1 wherein said atmosphere is a member selected from the group consisting of argon, helium, nitrogen and mixtures thereof.

6. The method of claim 1 wherein said atmosphere is nitrogen.

7. The method of claim 1 wherein prior to sintering, the green body is subjected to a prefiring step and the prefired body is machined to shape.

8. A method of making a pre-shaped dense sintered silicon carbide ceramic article comprising the steps of:
  a. forming a substantially homogeneous first dispersion of a submicron powder of β-silicon carbide, a boron containing additive in an amount equivalent to about 0.3-3.0% by weight of boron based on said silicon carbide,
  b. incorporating in said first dispersion a carbonaceous additive in an amount equivalent to 0.1-1.0% by weight of elemental carbon after pyrolysis based on said silicon carbide, to form a second dispersion,
  c. pyrolyzing said second dispersion at a temperature which decomposes the carbonaceous additive to elemental carbon.
  d. shaping the resulting pyrolyzed dispersion into a green body substantially in the form of said desired pre-shaped sintered article and of dimensions larger than those of said desired sintered article by the amount of sintering shrinkage, and
  e. sintering the green body in an inert atmosphere chemically inert with respect to silicon carbide at atmospheric pressure or below atmospheric pressure at a temperature of about 1900°-2100° C until the ceramic article has a density of at least 85% of theoretical.

9. The method of claim 8 wherein said boron additive is elemental boron.

10. The method of claim 8 wherein said boron additive is boron carbide.

11. The method of claim 8 wherein said first dispersion is formed by the steps comprising forming a silica gel in a solution containing sugar and boric acid, dehydrating the gel to form a finely divided mixture and heating the mixture in an inert atmosphere to form a boron doped silicon carbide powder.

12. The method of claim 8 wherein said carbonaceous additive is a phenolformaldehyde condensate resin.

13. The method of claim 8 wherein said carbonaceous additive is polyphenylene.

14. The method of claim 8 wherein said carbonaceous additive is polymethylphenylene.

15. The method of claim 8 wherein said green body is formed by slip casting.

16. A pre-shaped sintered ceramic article consisting essentially of silicon carbide, about 0.3–3.0% by weight of boron based on said silicon carbide, and up to 1.0% by weight of elemental carbon based on said silicon carbide, the sintered ceramic article having a density of at least 85% of theoretical.

17. The pre-shaped sintered ceramic article according to claim 16 wherein said elemental carbon is present in an amount of 0.1 to 1.0% by weight.

18. A pre-shaped sintered ceramic article consisting essentially of β-silicon carbide, about 0.3–3.0% by weight of boron based on said silicon carbide, and up to 1.0% by weight of elemental carbon based on said silicon carbide, the sintered ceramic article having a density of at least 85% of theoretical and a fine grained uniform microstructure.

19. The pre-shaped sintered ceramic article according to claim 18 wherein said elemental carbon is present in an amount of 0.1–1.0% by weight.

20. The pre-shaped sintered ceramic article of claim 18, wherein said article has a complex shape.

21. The pre-shaped sintered ceramic article of claim 18, wherein said article is a gas turbine blade.

22. A pre-shaped sintered silicon carbide ceramic article consisting essentially of β-silicon carbide, about 0.3–3.0% by weight of boron based on said silicon carbide, and up to 1.0% by weight of elemental carbon based on said silicon carbide, said ceramic article having a density of at least 95% of theoretical and a uniform grain size of less than 10 microns.

23. The pre-shaped sintered ceramic article according to claim 22 wherein said elemental carbon is present in an amount of 0.1–1.0% by weight.

* * * * *